US012789793B2

(12) United States Patent
Zhang et al.

(10) Patent No.: US 12,789,793 B2
(45) Date of Patent: Nov. 10, 2026

(54) FEATURE ARBITRATION SYSTEM FOR A VEHICLE

(71) Applicant: GM Global Technology Operations LLC, Detroit, MI (US)

(72) Inventors: Yubiao Zhang, Troy, MI (US); Nikolai K. Moshchuk, Grosse Pointe Farms, MI (US); Chad T. Zagorski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/939,881

(22) Filed: Nov. 7, 2024

(65) Prior Publication Data

US 2026/0125051 A1 May 7, 2026

(51) Int. Cl.
*B60W 30/09* (2012.01)
*B60W 10/18* (2012.01)
*B60W 10/20* (2006.01)

(52) U.S. Cl.
CPC ............ *B60W 30/09* (2013.01); *B60W 10/18* (2013.01); *B60W 10/20* (2013.01); *B60W 2554/802* (2020.02)

(58) Field of Classification Search
CPC ...... B60W 30/09; B60W 10/18; B60W 10/20; B60W 2554/802
See application file for complete search history.

(56) References Cited

U.S. PATENT DOCUMENTS

| | | | | |
|---|---|---|---|---|
| 2015/0353062 A1* | 12/2015 | Breuer | .................. | B60W 30/09 701/70 |
| 2024/0149871 A1* | 5/2024 | Bruno | .................. | B60W 30/09 |

FOREIGN PATENT DOCUMENTS

| | | |
|---|---|---|
| DE | 10036276 A1 | 2/2002 |
| DE | 102004056027 A1 | 5/2006 |
| DE | 102009058035 A1 | 8/2010 |

* cited by examiner

*Primary Examiner* — Grant Moubry
*Assistant Examiner* — Ruben Picon-Feliciano
(74) *Attorney, Agent, or Firm* — Honigman LLP; Matthew H. Szalach

(57) ABSTRACT

A computer-implemented method when executed by data processing hardware causes the data processing hardware to perform operations. The operations include receiving, at a feature arbitration architecture, input signals from one or more vehicle systems, initiating, by the feature arbitration architecture, a dynamic model configured with an automatic emergency braking (AEB) protocol and an automatic evasive steering (AES) protocol, and issuing, in response to the initiation of the dynamic model, a first alert by the feature arbitration architecture. The operations also include triggering, based on the input signals, activation criteria of one of the AEB protocol and the AES protocol, executing, based on the triggered activation criteria, one of the AEB protocol and the AES protocol, and executing, based on the executed one of the AEB protocol and the AES protocol, a maneuver of one of an AEB system and an AES system.

20 Claims, 6 Drawing Sheets

FEATURE ARBITRATION SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a feature arbitration system for a vehicle.

Vehicles may be equipped with various safety features that can assist an operator of the vehicle to avoid damage causing incidents, such as collisions. For example, some vehicles are equipped with automatic steering mechanisms to assist in maneuvering the vehicle away from a potential collision. The steering maneuvers executed by the automatic steering mechanisms are typically executed by a dynamic, kinematic model that may be inaccurate. Inaccuracies may stem from factors that are overlooked by the model. Some of the factors that may be overlooked include the condition of the road, delay in actuators, and the utilization of multiple actuators to generate lateral movement. Further, these models are typically invalid at low speeds due to steering physical limits. Thus, there is a need for an improved model that can accurately execute an automatic evasive steering maneuver.

SUMMARY

In some aspects, a computer-implemented method when executed by data processing hardware causes the data processing hardware to perform operations. The operations include receiving, at a feature arbitration architecture, input signals from one or more vehicle systems, initiating, by the feature arbitration architecture, a dynamic model configured with an automatic emergency braking (AEB) protocol and an automatic evasive steering (AES) protocol, and issuing, in response to the initiation of the dynamic model, a first alert by the feature arbitration architecture. The operations also include triggering, based on the input signals, activation criteria of one of the AEB protocol and the AES protocol, executing, based on the triggered activation criteria, one of the AEB protocol and the AES protocol, and executing, based on the executed one of the AEB protocol and the AES protocol, a maneuver of one of an AEB system and an AES system.

In some examples, triggering the activation criteria may include determining whether the activation criteria of the AEB protocol is satisfied and executing, based on the activation criteria of the AEB protocol being satisfied, the AEB protocol. Optionally, triggering the activation criteria may include determining whether the activation criteria of the AEB protocol is satisfied and determining, based on the activation criteria of the AEB protocol being unsatisfied, whether the activation criteria of the AES protocol is satisfied. In some instances, the activation criteria may include an activation threshold, the feature arbitration architecture configured to compare the input signals with the activation threshold to determine the triggering of the activation criteria. Optionally, the input signals may include brake data, steering data, and sensor data.

The operations may also include determining a time-to-collision based on a longitudinal distance of the input signals and determining an end position marker based on the time-to-collision. In some instances, determining the time-to-collision may include determining road friction based on at least one of the sensor data. In other examples, determining the time-to-collision may include executing an AEB model of the AEB protocol and an AES model of the AES protocol. In further examples, executing the AES protocol may include verifying, based on the sensor data, a lane availability and executing the AES system is based on the verified lane availability. Optionally, the activation criteria of the AEB protocol may include a speed threshold.

In other aspects, a feature arbitration system for a vehicle includes data processing hardware and memory hardware in communication with the data processing hardware. The memory hardware stores instructions that when executed on the data processing hardware cause the data processing hardware to perform operations. The operations include receiving, at a feature arbitration architecture, input signals from one or more vehicle systems, initiating, by the feature arbitration architecture, a dynamic model configured with an automatic emergency braking (AEB) protocol and an automatic evasive steering (AES) protocol, and issuing, in response to the initiation of the dynamic model, an alert by the feature arbitration architecture. The operations also include triggering, based on the input signals, activation criteria of one of the AEB protocol and the AES protocol, executing, based on the triggered activation criteria, one of the AEB protocol and the AES protocol, and executing, based on the executed one of the AEB protocol and the AES protocol, a maneuver of one of an AEB system and an AES system.

In some examples, triggering the activation criteria may include determining whether the activation criteria of the AEB protocol is satisfied and executing, based on the activation criteria of the AEB protocol being satisfied, the AEB protocol. Optionally, triggering the activation criteria may include determining whether the activation criteria of the AEB protocol is satisfied and determining, based on the activation criteria of the AEB protocol being unsatisfied, whether the activation criteria of the AES protocol is satisfied. In some instances, the activation criteria may include an activation threshold, the feature arbitration architecture configured to compare the input signals with the activation threshold to determine the triggering of the activation criteria. Optionally, the input signals may include brake data, steering data, and sensor data.

The operations may also include determining a time-to-collision based on a longitudinal distance of the input signals and determining an end position marker based on the time-to-collision. In some instances, determining the time-to-collision may include executing an AEB model of the AEB protocol and an AES model of the AES protocol. Optionally, executing the AES protocol may include verifying, based on the sensor data, a lane availability and executing the AES system is based on the verified lane availability. In some examples, the activation criteria of the AEB protocol may include a speed threshold.

In another aspect, a feature arbitration system for a vehicle includes data processing hardware and memory hardware in communication with the data processing hardware. The memory hardware stores instructions that when executed on the data processing hardware cause the data processing hardware to perform operations. The operations include receiving, at a feature arbitration architecture, input signals from one or more vehicle systems, initiating, by the feature arbitration architecture, a dynamic model configured with an automatic emergency braking (AEB) protocol and an automatic evasive steering (AES) protocol, issuing, in response to the initiation of the dynamic model, an alert by the feature arbitration architecture, and executing, via the feature arbitration architecture, an AEB model of the AEB protocol and an AES model of the AES protocol. The operations also include determining, based on the AEB model and the AES model and a longitudinal distance of the input signals, a time-to-collision, triggering, based on the input signals and the time-to-collision, activation criteria of one of the AEB protocol and the AES protocol, executing, based on the triggered activation criteria, one of the AEB protocol and the AES protocol, and executing, based on the executed one of the AEB protocol and the AES protocol, a maneuver of one of an AEB system and an AES system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
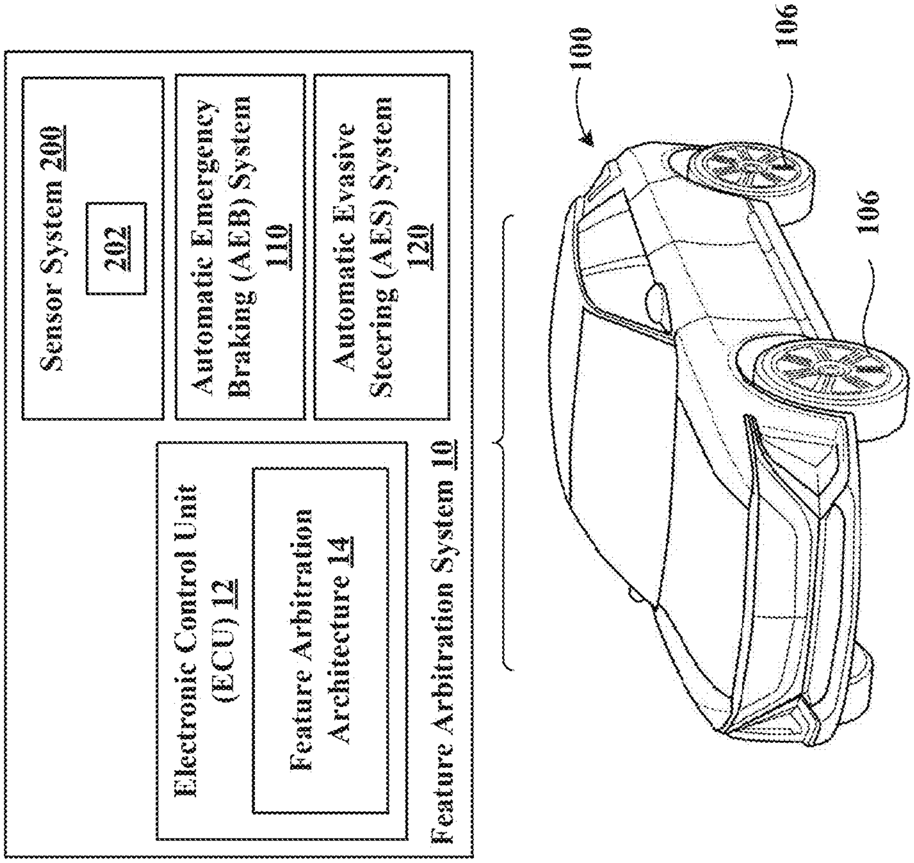
FIG. 1 is a schematic diagram of a vehicle equipped with a feature arbitration system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors.

The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
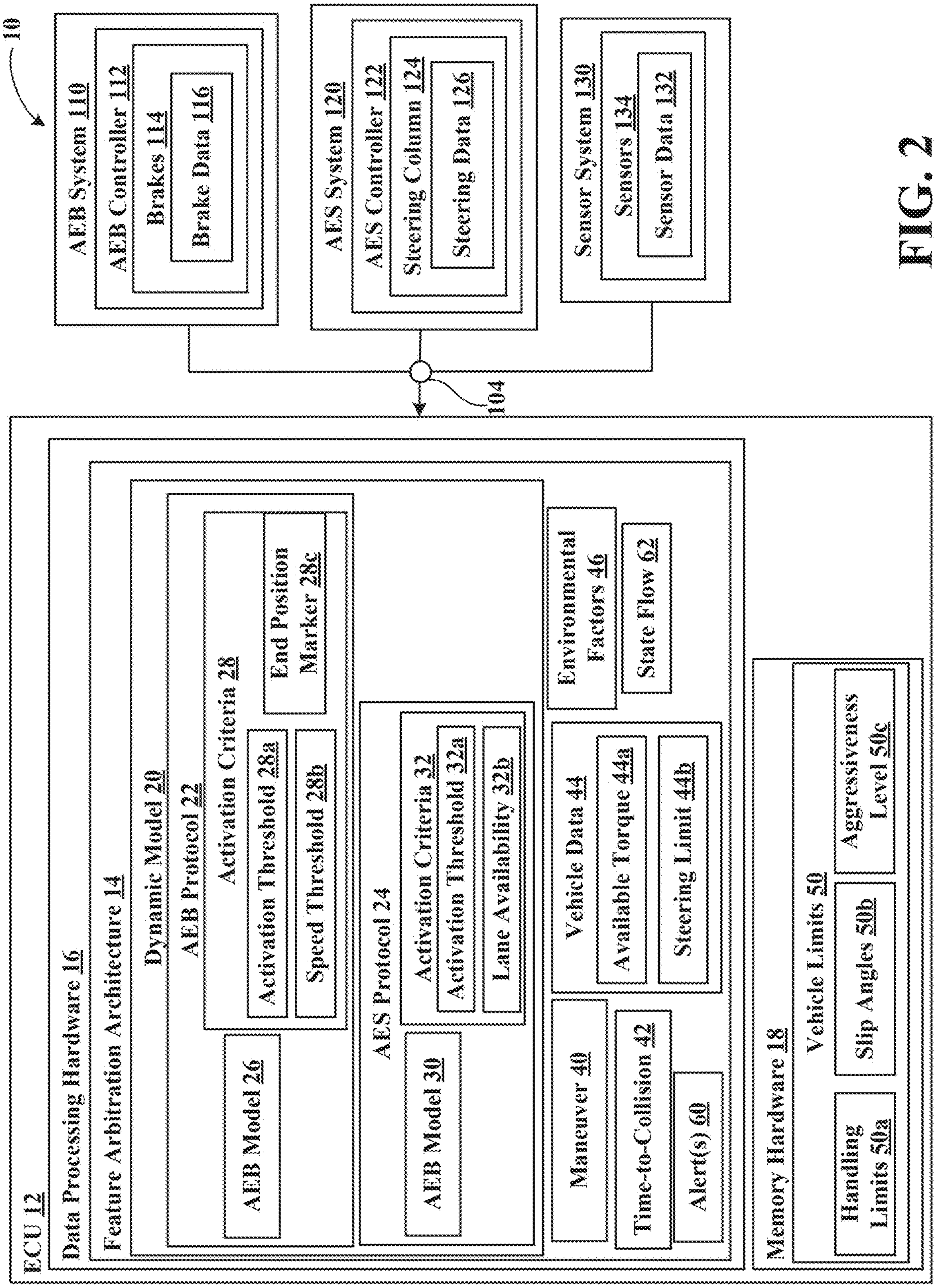
FIG. 2 is an exemplary block diagram of a feature arbitration system according to the present disclosure.
Figure 3:
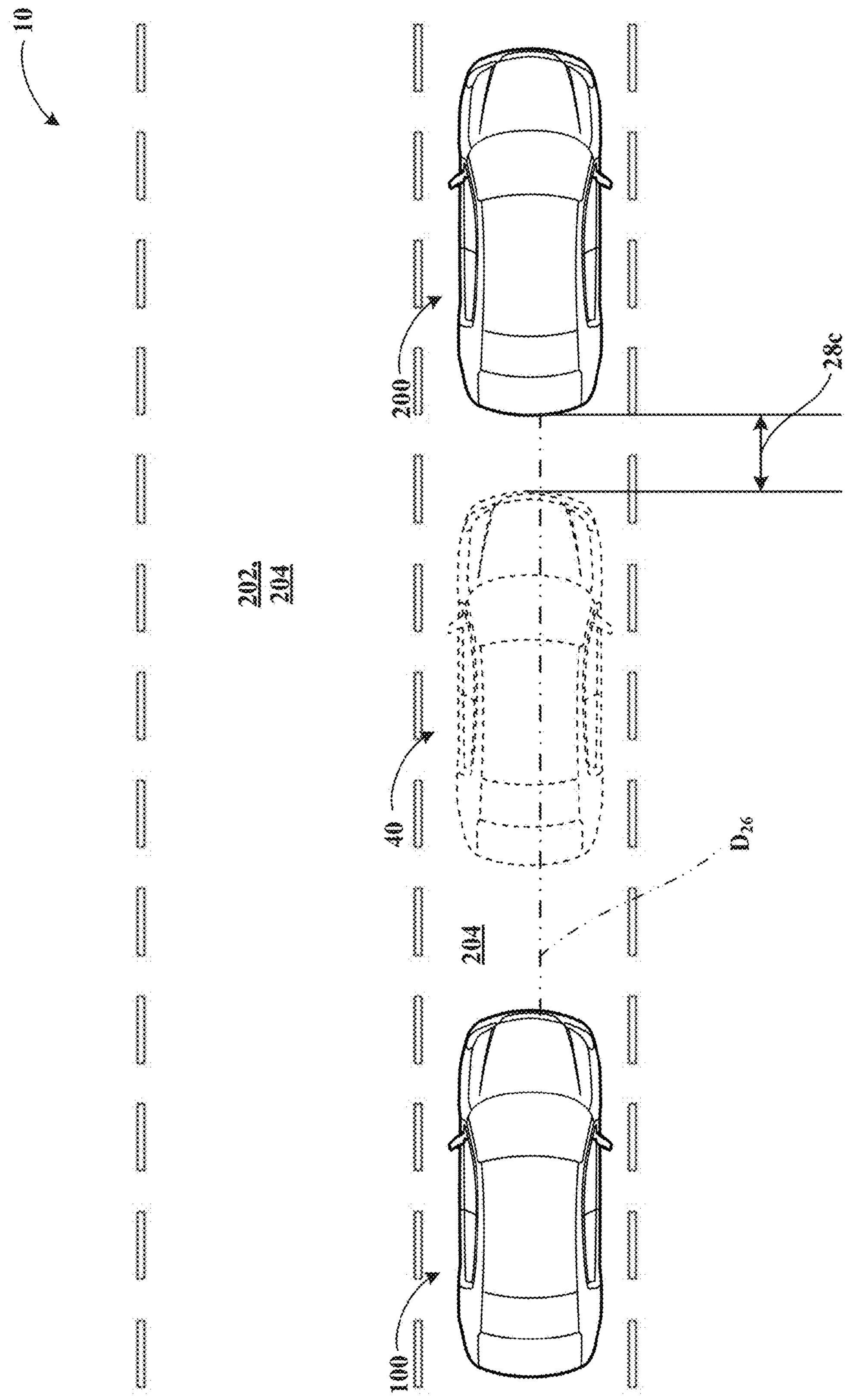
FIG. 3 is a schematic diagram of a vehicle equipped with the feature arbitration system of FIG. 2, the vehicle executing an automatic emergency braking system.

Referring to FIGS. 1-3, a feature arbitration system 10 includes an electronic control unit (ECU) 12 configured with a feature arbitration architecture 14. The ECU 12 may be incorporated with a vehicle 100. In other instances, the ECU 12 may be off-board the vehicle 100 and in communication with the vehicle 100. For purposes of this disclosure, the ECU 12 is described with respect to incorporation in the vehicle 100. The vehicle 100 is configured with various vehicle systems 102 that are communicatively coupled with the ECU 12 to transmit input signals 104 to the feature arbitration architecture 14. For example, the vehicle systems 102 include an automatic emergency braking (AEB) system 110 and an automatic evasive steering (AES) system 120, described in more detail below. The vehicle systems 102 also include a sensor system 130 equipped at the vehicle 100 that is configured to capture sensor data 132, described below.

The AEB system 110 is configured with an AEB controller 112 that monitors brakes 114 of the vehicle 100 and captures brake data 116 of the brakes 114. The AES system 120 is configured with an AES controller 122 that monitors a steering column 124 of the vehicle 100 to capture steering data 126. Each of the AEB controller 112 and the AES controller 122 are communicatively coupled with the ECU 12 to transmit the brake data 116 and the steering data 126 to the ECU 12 for use in the feature arbitration architecture 14. The ECU 12 is also communicatively coupled with the sensor system 130 to receive the sensor data 132 for use in the feature arbitration architecture 14. The sensor system 130 may include various sensors 134 including, but not limited to, cameras, radars, LIDAR, proximity sensors, tire sensors, and any other practicable sensor to monitor the vehicle 100 and a surrounding environment of the vehicle 100. The sensors 134 are configured to capture the sensor data 132, and the sensor system 130 transmits the sensor data 132 as part of the input signals 104 of the vehicle systems 102 to the ECU 12 for use with the feature arbitration architecture 14. The input signals 104 also include the brake data 116 and the steering data 126 from each of the AEB system 110 and the AES system 120, respectively.

Referring still to FIGS. 1-3, the ECU 12 includes data processing hardware 16 configured to execute the feature arbitration architecture 14 and memory hardware 18 in communication with the data processing hardware 16. The memory hardware 18 stores instructions that, when executed on the data processing hardware 16, cause the data processing hardware 16 to perform operations, described herein. For example, the operations are represented by the operative functions of the feature arbitration architecture 14. The arbitration architecture 14 includes a dynamic model 20 that is configured to determine execution of one of the AEB system 110 and the AES system 120. The dynamic model 20 simulates motion of the vehicle 100 to calculate how much time one of the AEB system 110 or the AES system 120 may need to execute a maneuver 40 (i.e., braking or a lane change). The dynamic model 20 is configured with an AEB protocol 22 and an AES protocol 24, which respectively correspond to potential execution of the AEB system 110 and the AES system 120.

The AEB protocol 22 is configured with an AEB model 26 and activation criteria 28. The activation criteria 28 include an activation threshold 28*a*, which is used by the dynamic model 20 to determine whether to activate the AEB protocol 22. Activation of the AEB protocol 22 results in activation of the AEB system 110. The AES protocol 24 is similarly equipped with an AES model 30 and activation criteria 32 including an activation threshold 32*a*. The dynamic model 20 executes each of the AEB model 26 and the AES model 30 to project a maneuver 40 to be executed by the vehicle 100.

The dynamic model 20 is configured to prioritize execution of the AEB system 110 over the AES system 120, such that the dynamic model 20 assesses the viability of the AEB protocol 22 prior to assessing the viability of the AES protocol 24. The viability of either of the AEB protocol 22 or the AES protocol 24 is determined by the respective activation criteria 28, 32. For example, the feature arbitration architecture 14 receives the input signals 104 from the vehicle systems 102 and initiates the dynamic model 20. The dynamic model 20 executes each of the AEB model 26 and the AES model 30 to determine a time-to-collision 42. The time-to-collision 42 is relative to a target 200 (i.e., a nearby vehicle), such that the dynamic model 20 determines the time-to-collision 42 with the target 200.

The dynamic model 20 utilizes the input signals 104 to determine the time-to-collision 42. As mentioned above, the input signals 104 include the brake data 116, the steering data 126, and the sensor data 132. The input signals 104 may inform vehicle data 44 utilized by the dynamic model 20 in determining the time-to-collision 42. For example, the vehicle data 44 may include a speed of the vehicle 100 gathered by the sensor system 130 relative to the target 200 and a distance of the vehicle 100 relative to the target 200. Further, the vehicle data 44 may include an available torque 44*a* of the brakes 114 and a steering limit 44*b* (i.e., angle and rate) of the steering column 124. The sensor data 132 also may inform environmental factors 46 utilized by the dynamic model 20 in determining the time-to-collision 42. For example, the environmental factors 46 may include road surface friction, which may affect or otherwise influence the determination of the time-to-collision 42.

The memory hardware 18 may store vehicle limits 50 that may be referenced by the dynamic model 20 in determining the time-to-collision 42. For example, the vehicle limits 50 may include handling limits 50*a* of the vehicle 100 and slip angles 50*b* of tires 106 of the vehicle 100, and an aggressiveness level 50*c*. The aggressiveness level 50*c* may be configured as an optimum lateral acceleration of the vehicle 100 while maintaining a comfortable stasis for an occupant. Thus, the aggressiveness level 50*c* may be preconfigured as part of the vehicle limits 50. The aggressiveness level 50*c* may inform, in part, the activation criteria 32 of the AES protocol 24. For example, the activation criteria 32 of the AES protocol 24 includes a lane availability 32*b*, which may be at least partially dependent on the aggressiveness level 50*c*. If an adjacent lane 202 is available, but the maneuver 40 would exceed the aggressiveness level 50*c*, then the feature arbitration architecture 14 may determine the AES protocol 24 is unavailable. The feature arbitration architecture 14 is configured to verify, based on the sensor data 132, the lane availability 32*b*. For example, the sensors 134 may capture images or other sensor data 132 that may provide the feature arbitration architecture 14 with the ability to determine the lane availability 32*b*. If the feature arbitration architecture 14 verifies the lane availability 32*b* and executes the AES protocol 24, then the AES system 120 may be executed based, at least in part, on the verified lane availability 32*b*.

Figure 4:
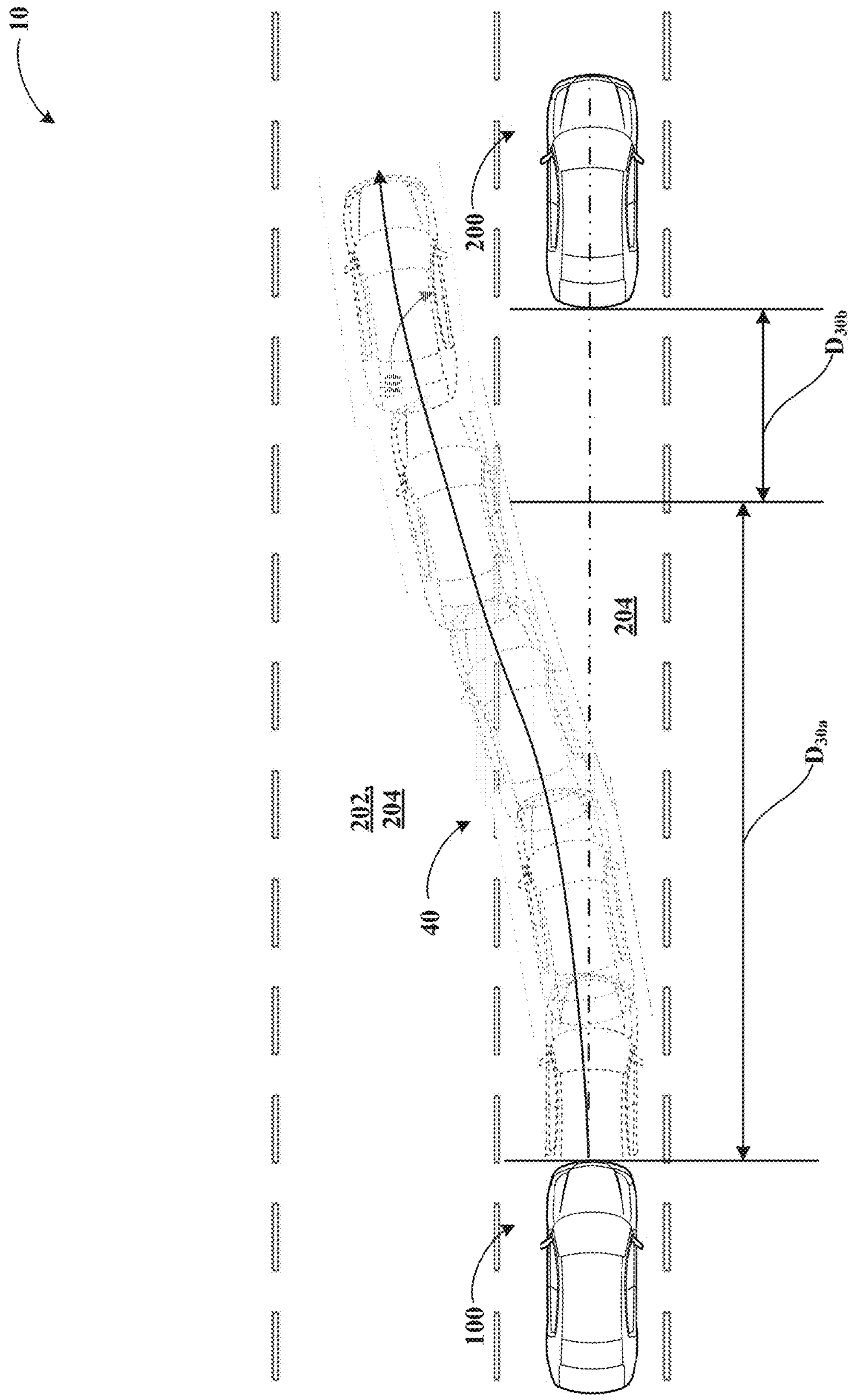
FIG. 4 is a schematic diagram of a vehicle equipped with the feature arbitration system of FIG. 2, the vehicle executing an automatic evasive steering system.

With reference to FIGS. 2-4, the feature arbitration architecture 14 is configured to prevent a potential collision with the target 200. In doing so, the feature arbitration architecture 14 executes the dynamic model 20 in response to the input signals 104. The dynamic model 20 executes the AEB model 26 and the AES model 30 to determine the time-to-collision 42. As generally mentioned above, the feature arbitration architecture 14 may be biased toward execution of the AEB protocol 22. For example, if both the AEB model 26 and the AES model 30 project similar results (i.e., avoiding a collision with the target 200), the feature arbitration architecture 14 may elect to execute the AEB protocol 22 to activate the AEB system 110. In other instances, the feature arbitration architecture 14 may elect to execute the AES protocol 24 over the AEB protocol 22 where the vehicle data 44 reflects a speed of the vehicle 100 exceeds a speed threshold 28*b*. Thus, if the speed of the vehicle 100 exceeds the speed threshold 28*b*, then the feature arbitration architecture 14 will execute the AES protocol 24 and activate the AES system 120.

Prior to execution of either protocol 22, 24, the ECU 12 determines whether the AEB system 110 and the AES system 120 are activated. For example, an operator of the vehicle 100 may disable either of the AEB system 110 or the AES system 120, such that the feature arbitration architecture 14 may elect to execute the activated or enabled system 110, 120. If both systems 110, 120 are disabled, the feature arbitration architecture 14 may be configured to issue an alert 60 indicating the potential for a collision and that the AEB system 110 and/or the AES system 120 are disabled. The user may activate either or both systems 110, 120 in response to the alert 60, and the feature arbitration architecture 14 may proceed with executing the dynamic model 20. If both systems 110, 120 are active or enabled, the feature arbitration architecture 14 may issue an alert 60 notifying an occupant that the dynamic model 20 has been initiated and a subsequent alert 60 when one of the systems 110, 120 is activated and implemented.

Upon initiation of the dynamic model 20, the AEB model 26 and the AES model 30 are executed. With respect to the AEB model 26, the dynamic model 20 determines a minimum longitudinal distance D relative to the target 200 to avoid an impact. The minimum longitudinal distance D is used to determine an end position marker 28*c*. The end position marker 28*c* is calibrated as part of the activation criteria 28. The end position marker 28*c* may also be determined by the time-to-collision 42, such that the end position marker 28*c* may be determined to be at a point prior to the determined time-to-collision 42. If the dynamic model 20 determines, based on the AEB model 26, that the vehicle 100 can avoid impact by executing the AEB system 110, then the AEB protocol 22 is executed by the feature arbitration architecture 14. The AEB model 26 utilizes the speed of the vehicle 100, a coefficient of friction between the tires 106 and road surface 204, a gravitational acceleration constant, and a braking compensation factor to determine the minimum longitudinal distance D.

The dynamic model 20 then utilizes the minimum longitudinal distance D to determine the time-to-collision 42 for the AEB model 26. For example, the minimum longitudinal distance $D_{26}$ may be divided by the speed of the vehicle 100, which is then combined with a delay factor. The delay factor may be considered for an expected delay in response of the AEB system 110. The time-to-collision 42 of the AEB model 26 may also be informed based on the activation criteria 28 of the AEB protocol 22, such that the activation criteria 28 may result in the dynamic model 20 proceeding with the AES protocol 24 over the AEB protocol 22. For example, the speed of the vehicle 100 may exceed the speed threshold 28*b*, mentioned above, such that execution of the AEB system 110 would be insufficient in preventing a collision.

The dynamic model 20 simultaneously runs the AES model 30 to determine the feasibility of executing the AES protocol 24. The simultaneous execution of the AEB model 26 and the AES model 30 allows the feature arbitration architecture 14 to determine which system 110, 120 to execute with minimal delay. The feature arbitration architecture 14 may execute a state flow 62 to transition to either the AEB system 110 or the AES system 120 based on the determination of the dynamic model 20. In some instances, the vehicle data 44 may change, such that the dynamic model 20 may alter which protocol 22, 24 to execute based on risk mitigation and impact severity. Thus, the feature arbitration architecture 14 is configured to respond to the determination made by the dynamic model 20 based on each of the AEB model 26 and the AES model 30.

As mentioned above, the AES model 30 is run simultaneously with the AEB model 26. The AES model 30 captures transient dynamics of the vehicle 100 relative to the target 200. For example, the AES model 30 may be configured with open-loop inputs that assess the steering data 126 with a direct yaw moment input at the center of gravity. The steering data 126 may include a front wheel steering angle 126*a* and a rear wheel steering angle 126*b*. For example, the AES model 30 may compare the steering data 126 with the vehicle data 4, such as a speed of the vehicle 100, to identify a maximum steering angle of the vehicle 100.

The AES model 30 may also utilize components, such as a lateral velocity of the vehicle 100, a yaw angle of the vehicle 100, a yaw rate of the vehicle 100, and a lateral position of the vehicle 100. For example, the AES model 30 may assess a minimum required distance $D_{30a}$ and a safety redundancy distance $D_{30b}$ to determine whether the AES system 120 can execute the maneuver 40 (i.e., lane change) based on the position of the vehicle 100 relative to the vehicle 100. The minimum required distance $D_{30a}$ informs the time-to-collision 42 of the AES model 30, which is the time in which the AES system 120 may execute an evasive steering collision action (i.e., avoidance).

The AES model 30 is dependent upon slip angle constraints of the front and rear tires 106 as well as environmental constraints present in the environmental factors 46. For example, the environmental factors 46 may determine whether a roadway 210 is wet, dry, icy, or in a condition that may otherwise affect a lane change maneuver 40. In addition to the distances $D_{30a}$, $D_{30b}$ and environmental factors 46, the AES model 30 utilizes the speed of the vehicle 100. The AES model 30 may be configured to generate at least one matrix to assess the movement of the vehicle 100 relative to the target 200.

In some instances, the feature arbitration architecture 14 may add brake assist functions to the AES protocol 24. For example, the speed of the vehicle 100 is less sensitive for an evasive steering maneuver 40 (i.e., a lane change) as compared to an emergency braking maneuver 40. Thus, the AES protocol 24 may include implementing a braking maneuver 40 in combination with the lane change maneuver 40. The braking maneuver 40 may assist in reducing the time-to-collision 42 of the AES model 30. As mentioned above, if the speed of the vehicle 100 exceeds the speed threshold 28*b* of the AEB protocol 22, then the feature arbitration architecture 14 may elect the AES protocol 24. The feature arbitration architecture 14 may elect the AES protocol 24, as the AES protocol 24 is configured to execute an evasive steering maneuver 40, which can be executed at a higher speed while in range of the time-to-collision 42, as compared to the AEB protocol 22. Further, the added braking maneuver 40 may further assist the AES protocol 24 execution to achieve the maneuver 40.

Ultimately, the activation criteria 28, 32 of one of the AEB protocol 22 and the AES protocol 24 are triggered based on the input signals 104 and the respective model 26, 30. For example, triggering the activation criteria 28 of the AEB protocol 22 may be a result of the dynamic model 20 determining that the activation criteria 28 of the AEB protocol 22 is satisfied. As a result, the feature arbitration architecture 14 executes the AEB protocol 22, which leads to activation of the AEB system 110. Comparatively, if the activation criteria 28 of the AEB protocol 22 is not satisfied and the activation criteria 32 of the AES protocol 24 is satisfied, then the activation criteria 32 of the AES protocol 24 may be triggered. As a result, the feature arbitration architecture 14 would execute the AES protocol 24, which would lead to activation of the AES system 120. The triggering of the activation criteria 28, 32 of either protocol 22, 24 is determined by the feature arbitration architecture 14 comparing the input signals 104 with the activation threshold 28*a*, 32*a* and any other components of the activation criteria 28, 32. For example, the activation criteria 28 also includes a speed threshold 28*b*, which is evaluated with the input signals 104 and vehicle data 44 by the feature arbitration architecture 14.

Figure 5:
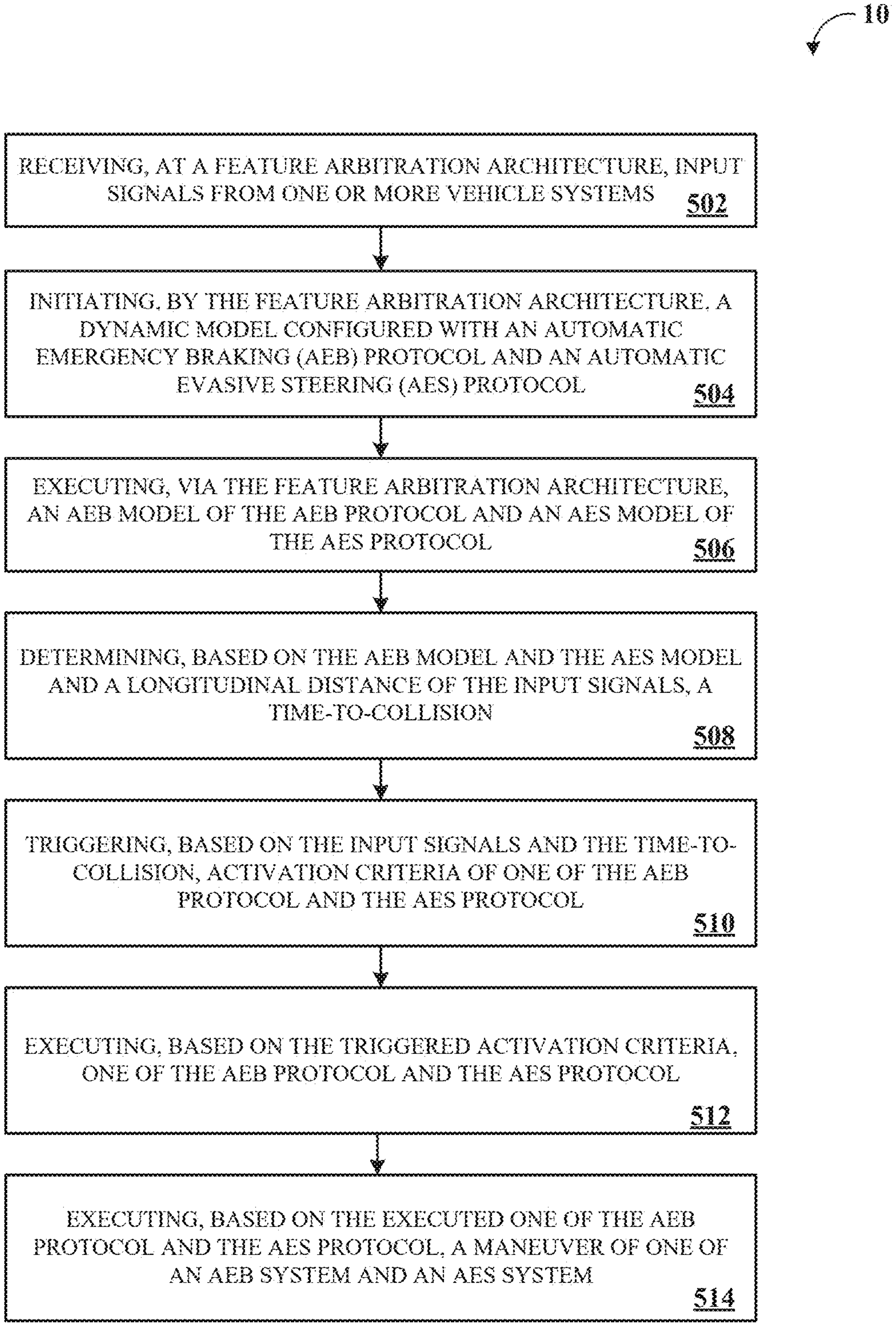
FIG. 5 is an exemplary method of execution of a feature arbitration system according to the present disclosure.

Referring to FIG. 5, an exemplary method for the feature arbitration system 10 is illustrated. At 500, a feature arbitration architecture 14 receives input signals 104 from one or more vehicle systems 102 and, at 502, initiates a dynamic model 20 configured with an AEB protocol 22 and an AES protocol 24. The feature arbitration architecture 14 issues, at 504, in response to the initiation of the dynamic model 20, an alert 60 and executes, at 506, an AEB model 26 of the AEB protocol 22 and an AES model 30 of the AES protocol 24. At 508, the dynamic model 20 determines, based on the AEB model 26 and the AES model 30 and a longitudinal distance $D_{26}$ of the input signals 104, a time-to-collision 42. Based on the input signals 104 and the time-to-collision 42, the feature arbitration architecture 14 triggers, at 510, activation criteria 28, 32 of one of the AEB protocol 22 and the AES protocol 24. The feature arbitration architecture executes, at 512, based on the triggered activation criteria 28, 32, one of the AEB protocol 22 and the AES protocol 24. The feature arbitration architecture 14 executes, at 514, based on the executed one of the AEB protocol 22 and the AES protocol 24, a maneuver 40 of one of an AEB system 110 and an AES system 120.

Figure 6:
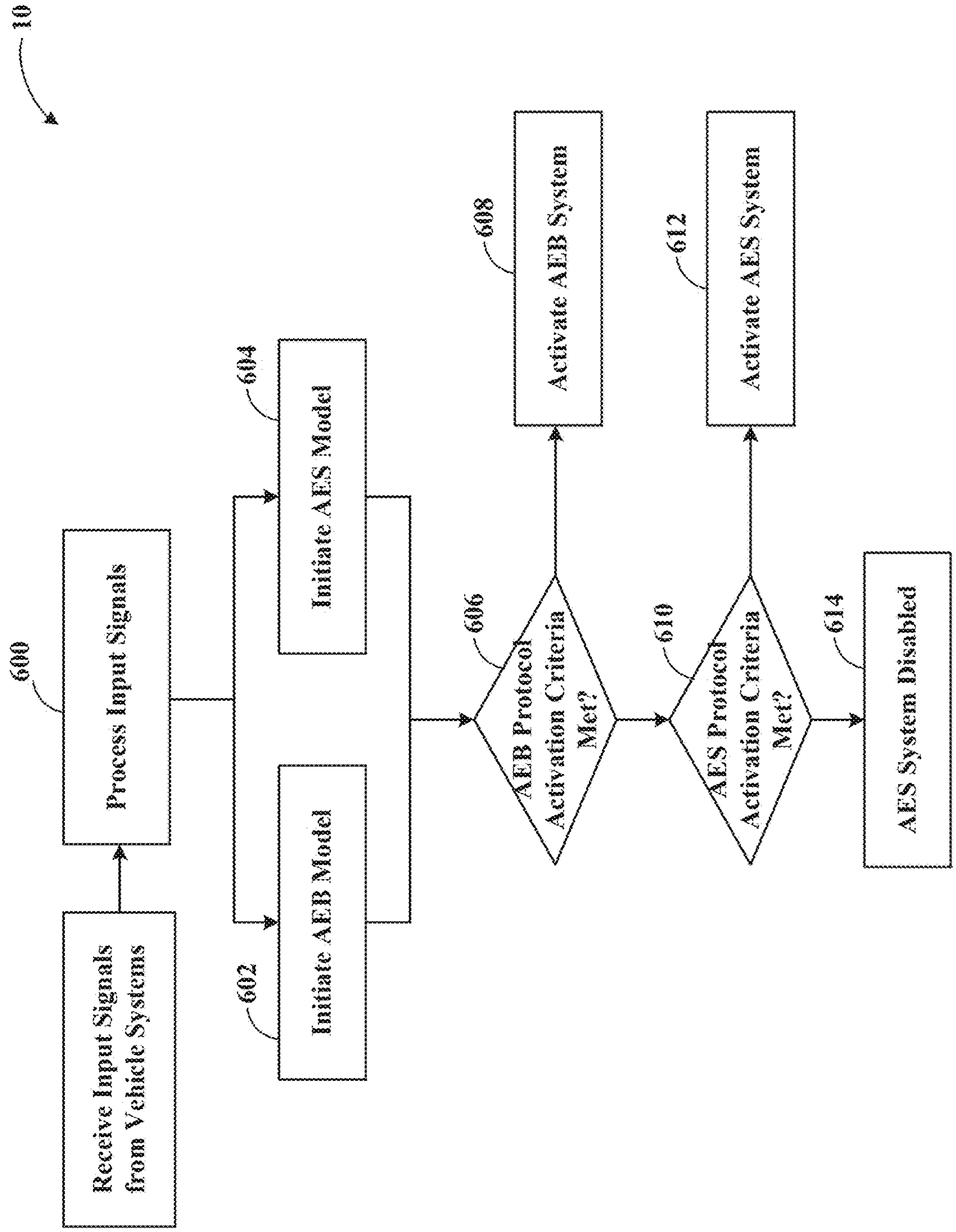
FIG. 6 is an exemplary flow diagram of a feature arbitration system according to the present disclosure.

Referring to FIG. 6, an exemplary flow diagram of the feature arbitration system 10 is illustrated. At 600, the feature arbitration architecture 14 processes input signals 104. At 602 and 604, the dynamic model 20 initiates the AEB model 26 and the AES model 30. At 606, the feature arbitration architecture 14 determines whether the activation criteria 28 of the AEB protocol 22 is met. If the activation criteria 28 is met, then the feature arbitration architecture 14 activates, at 608, the AEB system 110. If the activation criteria 28 is not met or otherwise not enabled, the feature arbitration architecture 14 determines, at 610, whether the activation criteria 32 of the AES protocol 24 is met. If the activation criteria 32 of the AES protocol 24 is met, then the feature arbitration architecture 14 activates, at 612, the AES system 120. If the activation criteria 32 is not met, then the feature arbitration architecture 14 determines, at 614, that the AES system 120 is disabled.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that when executed by data processing hardware causes the data processing hardware to perform operations comprising:
- receiving, at a feature arbitration architecture, input signals from one or more vehicle systems;
- initiating, by the feature arbitration architecture, a dynamic model configured with an automatic emergency braking (AEB) protocol and an automatic evasive steering (AES) protocol;
- issuing, in response to the initiation of the dynamic model, a first alert by the feature arbitration architecture;
- triggering, based on the input signals, activation criteria of one of the AEB protocol and the AES protocol;
- executing, based on the triggered activation criteria, one of the AEB protocol and the AES protocol;
- executing, simultaneously, an AEB model of the AEB protocol and an AES model of the AES protocol via the feature arbitration architecture; and
- executing, based on the executed one of the AEB protocol and the AES protocol, a maneuver of one of an AEB system and an AES system.

2. The method of claim 1, wherein triggering the activation criteria includes determining whether the activation criteria of the AEB protocol are satisfied and executing, based on the activation criteria of the AEB protocol being satisfied, the AEB protocol.

3. The method of claim 1, wherein triggering the activation criteria includes determining whether the activation criteria of the AEB protocol are satisfied and determining, based on the activation criteria of the AEB protocol being unsatisfied, whether the activation criteria of the AES protocol are satisfied.

4. The method of claim 1, wherein the activation criteria include an activation threshold, the feature arbitration architecture configured to compare the input signals with the activation threshold to determine the triggering of the activation criteria.

5. The method of claim 1, wherein the input signals include brake data, steering data, and sensor data.

6. The method of claim 5, further including determining a time-to-collision based on a longitudinal distance of the input signals and determining an end position marker based on the time-to-collision.

7. The method of claim 6, wherein determining the time-to-collision includes determining road friction based on at least one of the sensor data.

8. The method of claim 6, wherein determining the time-to-collision includes executing the AEB model of the AEB protocol and the AES model of the AES protocol.

9. The method of claim 5, wherein executing the AES protocol includes verifying, based on the sensor data, a lane availability and executing the AES system is based on the verified lane availability.

10. The method of claim 5, wherein the activation criteria of the AEB protocol include a speed threshold.

11. A feature arbitration system for a vehicle, the feature arbitration system comprising:
- data processing hardware; and
- memory hardware in communication with the data processing hardware, the memory hardware storing instructions that when executed on the data processing hardware cause the data processing hardware to perform operations comprising:
  - receiving, at a feature arbitration architecture, input signals from one or more vehicle systems;
  - initiating, by the feature arbitration architecture, a dynamic model configured with an automatic emergency braking (AEB) protocol and an automatic evasive steering (AES) protocol;
  - issuing, in response to the initiation of the dynamic model, an alert by the feature arbitration architecture;
  - triggering, based on the input signals, activation criteria of one of the AEB protocol and the AES protocol;
  - executing, based on the triggered activation criteria, one of the AEB protocol and the AES protocol;
  - executing, simultaneously, an AEB model of the AEB protocol and an AES model of the AES protocol via the feature arbitration architecture; and
  - executing, based on the executed one of the AEB protocol and the AES protocol, a maneuver of one of an AEB system and an AES system.

12. The feature arbitration system of claim 11, wherein triggering the activation criteria includes determining whether the activation criteria of the AEB protocol are satisfied and executing, based on the activation criteria of the AEB protocol being satisfied, the AEB protocol.

13. The feature arbitration system of claim 11, wherein triggering the activation criteria includes determining whether the activation criteria of the AEB protocol are satisfied and determining, based on the activation criteria of the AEB protocol being unsatisfied, whether the activation criteria of the AES protocol are satisfied.

14. The feature arbitration system of claim 11, wherein the activation criteria include an activation threshold, the feature arbitration architecture configured to compare the input signals with the activation threshold to determine the triggering of the activation criteria.

15. The feature arbitration system of claim 11, wherein the input signals include brake data, steering data, and sensor data.

16. The feature arbitration system of claim 15, further including determining a time-to-collision based on a longitudinal distance of the input signals and determining an end position marker based on the time-to-collision.

17. The feature arbitration system of claim 16, wherein determining the time-to-collision includes executing the AEB model of the AEB protocol and the AES model of the AES protocol.

18. The feature arbitration system of claim 15, wherein executing the AES protocol includes verifying, based on the sensor data, a lane availability and executing the AES system is based on the verified lane availability.

19. The feature arbitration system of claim 15, wherein the activation criteria of the AEB protocol include a speed threshold.

20. A feature arbitration system for a vehicle, the feature arbitration system comprising:

data processing hardware; and memory hardware in communication with the data processing hardware, the memory hardware storing instructions that when executed on the data processing hardware cause the data processing hardware to perform operations comprising:

receiving, at a feature arbitration architecture, input signals from one or more vehicle systems;

initiating, by the feature arbitration architecture, a dynamic model configured with an automatic emergency braking (AEB) protocol and an automatic evasive steering (AES) protocol;

issuing, in response to the initiation of the dynamic model, an alert by the feature arbitration architecture;

executing, via the feature arbitration architecture, an AEB model of the AEB protocol and an AES model of the AES protocol, simultaneously;

determining, based on the AEB model and the AES model and a longitudinal distance of the input signals, a time-to-collision;

triggering, based on the input signals and the time-to-collision, activation criteria of one of the AEB protocol and the AES protocol;

executing, based on the triggered activation criteria, one of the AEB protocol and the AES protocol; and executing, based on the executed one of the AEB protocol and the AES protocol, a maneuver of one of an AEB system and an AES system.

* * * * *